Figure 1:
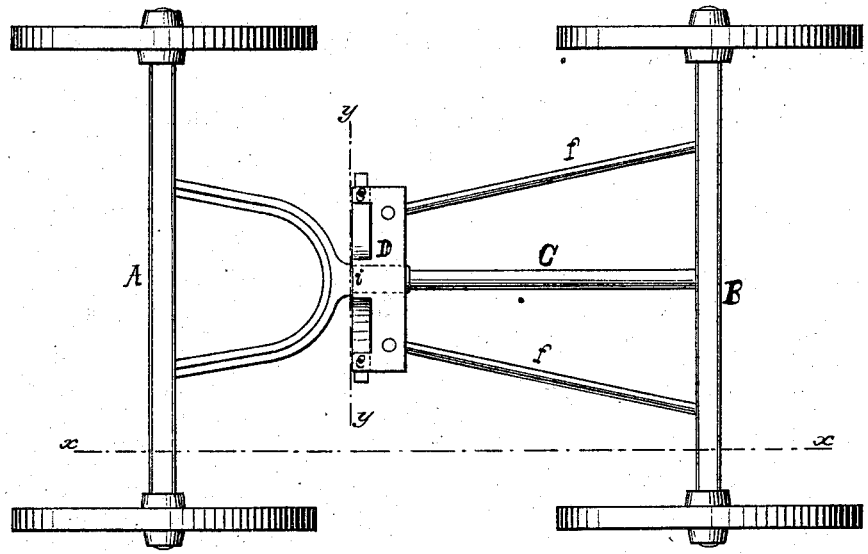
Figure 2:
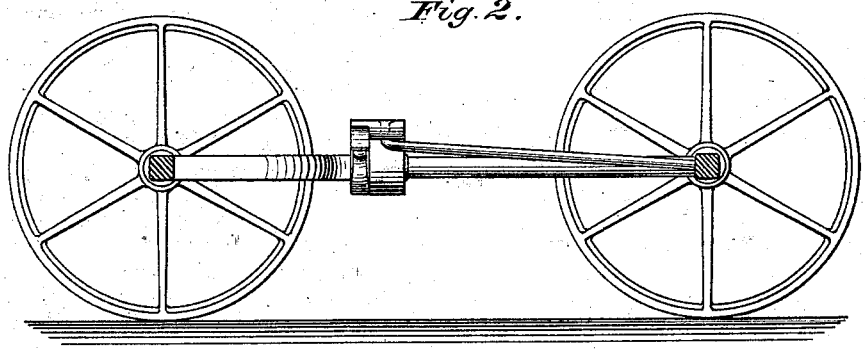
Figure 3:
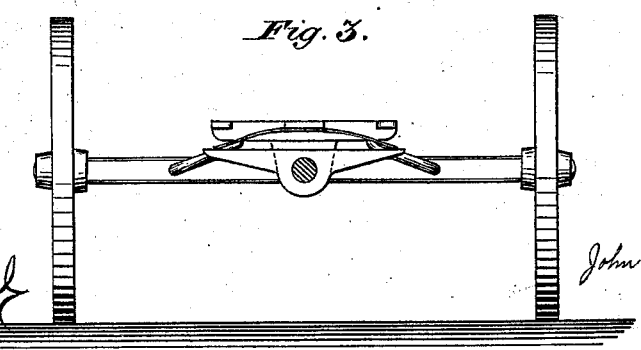

J. H. MARTIN.
Children's Carriages.

No. 149,591.   Patented April 14, 1874.

Witnesses:   Inventor:

UNITED STATES PATENT OFFICE.

JOHN HENRY MARTIN, OF NORTH SPRINGFIELD, VERMONT.

IMPROVEMENT IN CHILDREN'S CARRIAGES.

Specification forming part of Letters Patent No. 149,591, dated April 14, 1874; application filed February 6, 1874.

*To all whom it may concern:*

Be it known that I, JOHN HENRY MARTIN, of North Springfield, in the county of Windsor and in the State of Vermont, have invented a new and useful Improvement in Children's Carriages; and I do hereby declare that the following is a full, clear, and exact description thereof, reference being had to the accompanying drawings.

The object of my invention is to secure ease and a greater degree of safety to the child occupant, and at the same time proper strength and increased durability to the carriage. To this end it consists in loosely jointing the rear end of the perch or center rod to the back axle, so as to allow any one of the wheels to rise or fall without affecting the others, or materially changing the position of the body of the carriage, and by a peculiar arrangement of the rocker and its relative position with the carriage and body, hereinafter more fully explained.

A is the front, and B the hind, axle of the carriage. C is a rod, which passes from the hind axle B. The center rod C is allowed to turn freely in the socket of the axle B, through which it passes. D is a plate, upon which rests the forward portion of the carriage-body, being attached to shaft C by means of a lug, through which said shaft loosely passes. This plate is supported at its ends, and held in a horizontal position by means of the rods $f\,f$, which are attached to the hind axle. It is notched on its front edge, so as to form three several projections—one, $i$, in the center, and one each, $e\,e$, at its ends. To the center piece is attached a semi-elliptic spring, $h$, the ends of which project downward and rest, when in a horizontal position, against the oscillating cross-bar, which is rigidly attached to the rod C, and supporting semi-elliptic spring. As one of the front wheels strikes a stone, the center rod or perch partially turns in the loose joint, and raises one end of the cross-bar against one end of the aforesaid spring, which steadies the oscillating motion of the cross-bar and breaks the force of any sudden jolt.

The body of the carriage, being independent of either axle, and being secured upon a rocker near the central point between them, is but slightly affected by the sudden rising and falling of the wheels as they pass over uneven surfaces, and is not so liable to be upset as those of the ordinary kind.

What I claim as new is—

1. The perch having the rear end jointed to the hind axle, braced by side rods and a cross-bar, and allowed to turn freely in its bearings, when the wheels are made to rise or fall by any unevenness of the roadway, all combined substantially as shown and described, and for the purpose set forth.

2. The cross-bar D and spring $h$, in combination with the jointed perch C and axle B, all as and for the purpose set forth.

JOHN HENRY MARTIN.

Witnesses:
    SAML. W. PORTER,
    RUFUS O. FORBUSH.